(12) United States Patent
Tsukuba

(10) Patent No.: US 8,879,098 B2
(45) Date of Patent: Nov. 4, 2014

(54) DISTRIBUTED PRINTING SYSTEM AND IMAGE FORMING APPARATUS, METHOD, AND SOFTWARE PROGRAM FOR SWITCHING BETWEEN A COLLABORATIVE PROCESSING MODE AND A CENTRALIZED PROCESSING MODE

(75) Inventor: Tomoyuki Tsukuba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 380 days.

(21) Appl. No.: 13/369,477

(22) Filed: Feb. 9, 2012

(65) Prior Publication Data
US 2012/0212762 A1 Aug. 23, 2012

(30) Foreign Application Priority Data
Feb. 22, 2011 (JP) .................................. 2011-035706

(51) Int. Cl.
G06F 3/12 (2006.01)
G03G 15/00 (2006.01)
H04N 1/32 (2006.01)
H04N 1/00 (2006.01)

(52) U.S. Cl.
CPC ....... *H04N 1/00347* (2013.01); *G03G 15/5083* (2013.01); *H04N 1/32523* (2013.01); *G06F 3/124* (2013.01); *H04N 1/32555* (2013.01); H04N 2201/0094 (2013.01); G06F 3/1215 (2013.01); *H04N 1/3255* (2013.01); G06F 3/1291 (2013.01); H04N 2201/001 (2013.01); G06F 3/1271 (2013.01); G06F 3/1212 (2013.01); G06F 3/1252 (2013.01)
USPC ...................................................... 358/1.15

(58) Field of Classification Search
CPC ............ H04N 1/00347; H04N 1/3255; G03G 15/5083; G06F 3/1271; G06F 3/1212; G06F 3/124
See application file for complete search history.

(56) References Cited

U.S. PATENT DOCUMENTS

2002/0102119 A1* 8/2002 Christodoulou et al. ....... 400/62
2007/0182991 A1* 8/2007 Matsuda ...................... 358/1.15

FOREIGN PATENT DOCUMENTS

| JP | 2002-55795 | 2/2002 |
|---|---|---|
| JP | 2002-333964 | 11/2002 |
| JP | 2003-36159 | 2/2003 |
| JP | 2003-337679 | 11/2003 |
| JP | 2004-236210 | 8/2004 |
| JP | 2005-275563 | 10/2005 |

* cited by examiner

Primary Examiner — Benny Q Tieu
Assistant Examiner — Sunil Chacko
(74) Attorney, Agent, or Firm — Oblon, Spivak, McClelland, Maier & Neustadt, L.L.P.

(57) ABSTRACT

A distributed printing system, in which a parent device divides image data into first and second image data, the first image data edited by the parent device itself, and the second image data requested of a child device to edit. The parent device sends the second image data to the child device and requests the child device to edit the second data, and generates first edited image data and sends the first edited image data to the child device. The child device generates second edited image data by editing the second image data received from the parent device, sends the second edited image data to the parent device, and prints out the first edited image data received from the parent device and the second edited image data sequentially. The parent device prints out the first edited image data and the second edited image data received from the child device sequentially.

11 Claims, 7 Drawing Sheets

FIG. 4
(a)
STEP 1
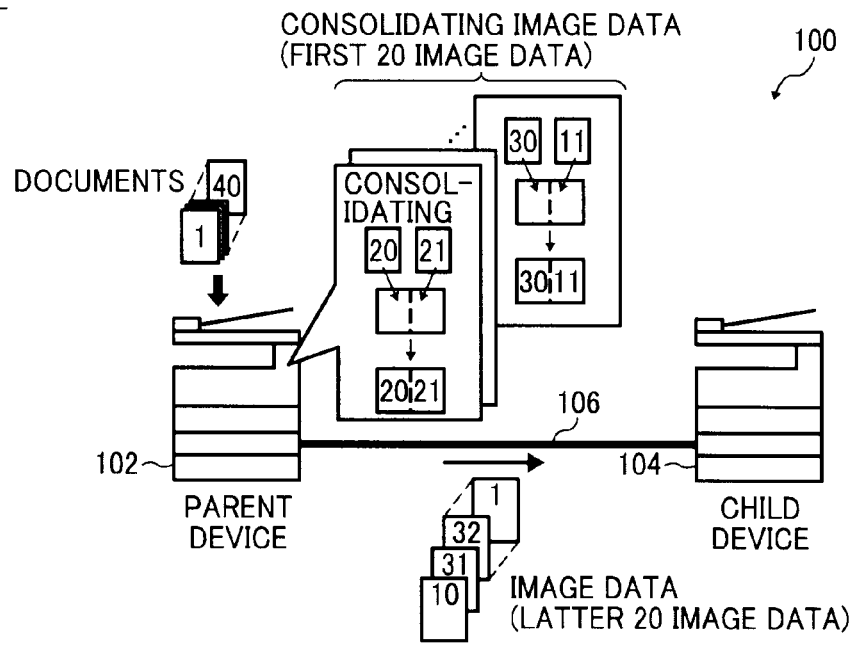
(b)
STEP 2
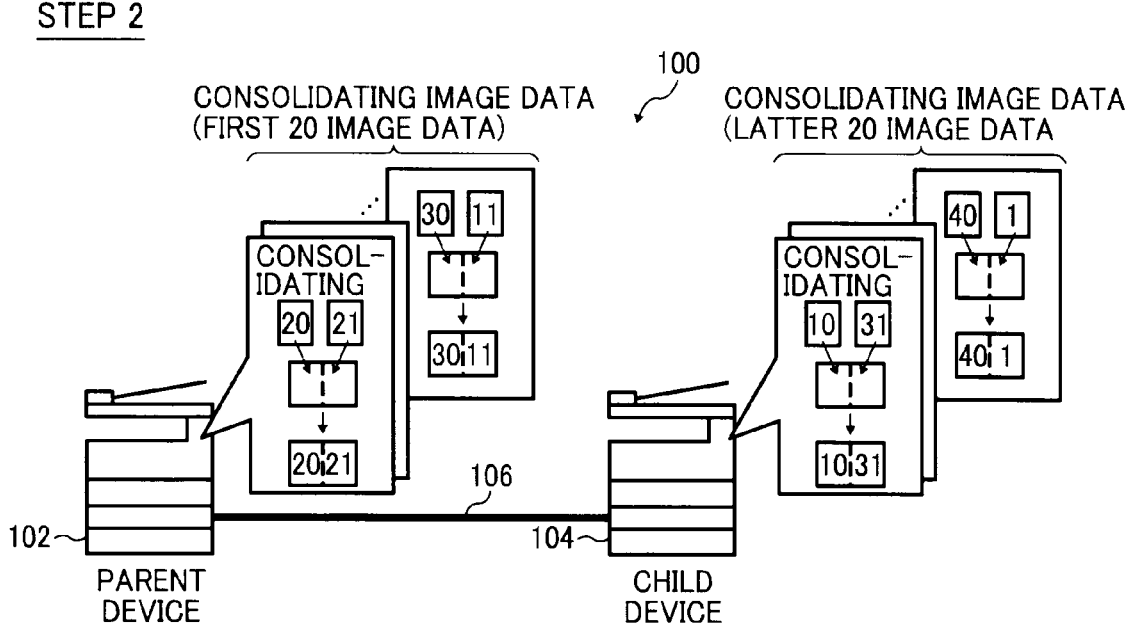

FIG. 5
(a) STEP 3
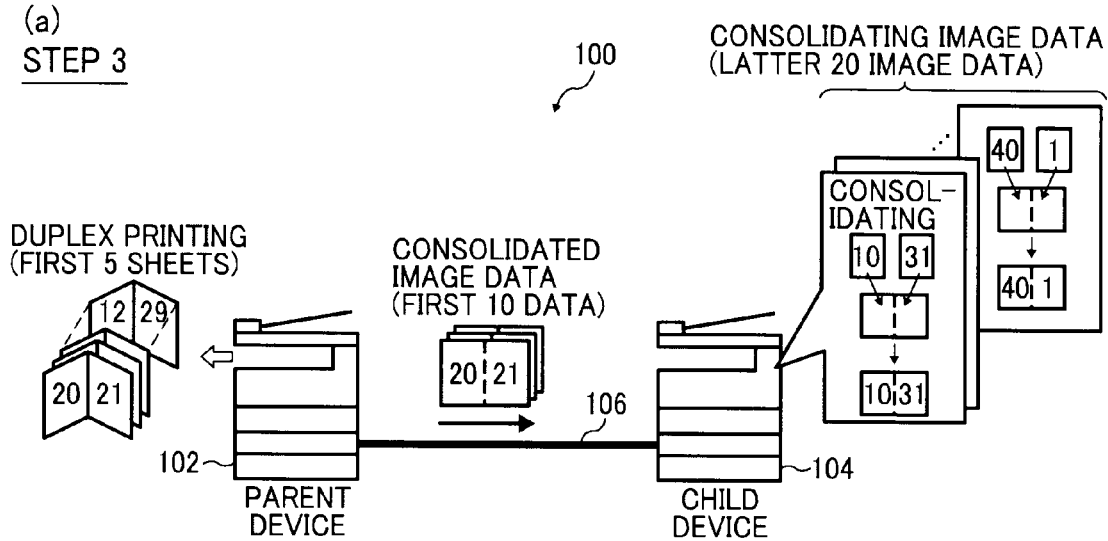
(b) STEP 4
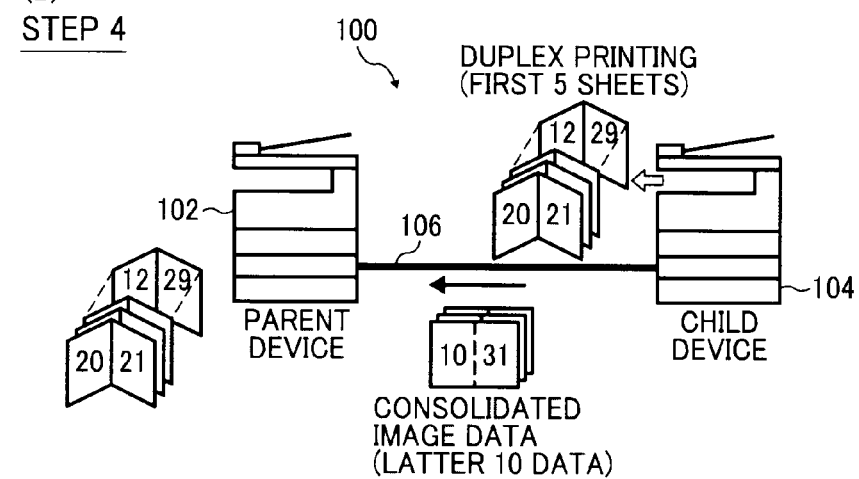
(c) STEP 5
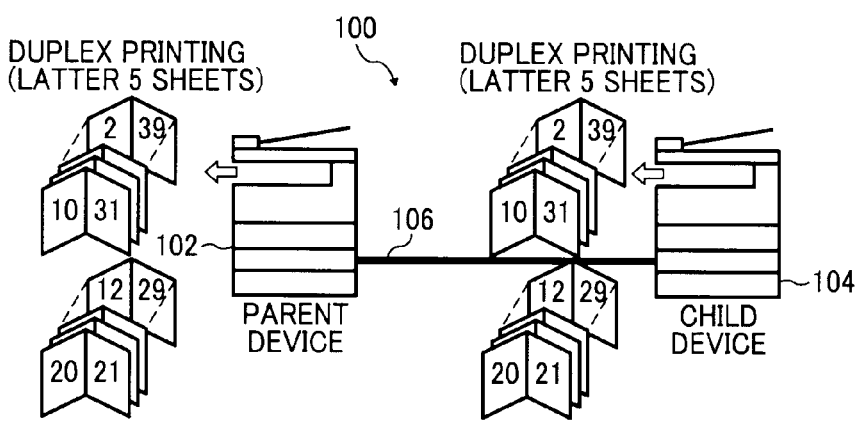

DISTRIBUTED PRINTING SYSTEM AND IMAGE FORMING APPARATUS, METHOD, AND SOFTWARE PROGRAM FOR SWITCHING BETWEEN A COLLABORATIVE PROCESSING MODE AND A CENTRALIZED PROCESSING MODE

CROSS-REFERENCE TO RELATED APPLICATIONS

This patent application is based on and claims priority pursuant to 35 U.S.C. §119 to Japanese Patent Application No. 2011-035706, filed on Feb. 22, 2011, the entire disclosure of which is hereby incorporated by reference herein.

BACKGROUND OF THE INVENTION

1. Field of the Invention

The present invention relates to a distributed printing system including a number of image forming apparatuses connected with each other, and more particularly relates to a distributed printing system that distributes and executes image editing.

2. Description of the Related Art

As it is widely demanded to make office work more efficient, it is also widely requested to improve productivity of image forming apparatuses such as a multifunction peripheral (MFP). Regarding this point, Japanese Patent Publication 2004-236210 (JP-2004-236210-A), a distributed printing system that a number of MFPs connected via a private or public network distribute and execute printing is described.

FIG. 7 illustrates a distributed printing system 500 described in JP-2004-236210-A. In the distributed printing system 500, MFP 502 and MFP 504 are communicably connected to each other via a private network 506. When a user prints 40 documents in booklet printing by using the distributed printing system 500, the MFP 502 (parent device) firstly scans the documents and generates 40 sets of image data. After that, the parent device executes consolidating (2 in 1) for 40 image data, generates 20 consolidated image data, and prints it out in booklet form. Meanwhile, the parent device sends the generated 20 consolidated image data to the MFP 504 (child device) in reverse order. After the child device that received the 20 consolidated image data from the parent device executes booklet printing for the 20 consolidated image data, the distributed printing system 500 finishes the whole printing.

There is merit in adopting architecture in which a MFP which scans documents executes all consolidating and a number of MFPs share only printing for the consolidated image data such as the consolidated printing system 500, provided that data sending time per unit image is much longer than image data consolidating time per unit image data (data consolidating time<<data sending time.) A description follows regarding this point.

In case architecture in which the parent device that scans documents sends image data to the child device and the child device consolidates the image data is adopted, the child device can not start consolidating until the child device finishes receiving all 40 image data, so the child device needs to store all the image data in its memory unit until transferring for all 40 image data finishes, and the child device can not release its memory resource for a long time in case data sending time is much longer than data consolidating time. By contrast, in architecture in which the parent device executes all consolidating, sends consolidated image data to the child device in reverse order, and requests the child device to print like the consolidated printing system 500, the child device can execute printing sequentially each time the child device receives consolidated image data from the parent device, and the child device can release its memory resource instantaneously and utilize its memory resource in more efficient way.

However, if data consolidating time is much longer than data sending time (data consolidating time>>data sending time), consolidating at the parent device becomes a bottleneck, so the productivity of the whole consolidated printing system 500 admits of further improvement.

BRIEF SUMMARY OF THE INVENTION

An object of the present invention is to resolve the issue in JP-2004-236210-A described above, and to implement a new consolidated printing system that maximizes productivity of the whole system in case data consolidating time per unit image is much longer than data sending time (data consolidating time>>data sending time.)

The present invention distributes and executes editing among a number of image forming apparatus in case data consolidating time per unit image is much longer than data sending time after making consideration thoroughly on a new consolidated printing system that maximizes productivity of the whole system.

Thus, according to the present invention, a distributed printing system in which a number of image forming apparatuses communicably connected to others distribute and execute printing can be implemented. In the distributed printing system, each image forming apparatus includes an image data generator to generate image data for each scanned document, an image data dividing unit to divide a number of the generated image data into first image data and second image data, the first image data to be edited by the image forming apparatus itself, and the second image data to be requested another image forming apparatus to edit, an edited image data generator to edit the image data to generate edited image data, an image data sending/receiving unit to send and receive image data to and from other image forming apparatus, and a printing unit. The image forming apparatus as a parent device, which generates the image data, sends the second image data to the other image forming apparatus as a child device, which shares printing with the parent device, and the parent device generates a first edited image data by editing the first image data, and sends the first edited image data to the child device. The child device generates a second edited image data by editing the second image data received from the parent device, sends the second edited image data to the parent device, and prints out the first edited image data received from the parent device and the second edited image data sequentially. The parent device prints out the first edited image data and the second edited image data received from the child device sequentially.

BRIEF DESCRIPTION OF THE DRAWINGS

FIG. 4 is a timing diagram illustrating operation of the distributed printing system according to the present invention;

FIG. 5 is a timing diagram illustrating operation of the distributed printing system according to the present invention;

DETAILED DESCRIPTION OF THE PREFERRED EMBODIMENTS

Embodiments of the present invention will be described below. The below-described embodiments should not be construed as limiting the scope of the invention. It should be noted that, in figures referred below, same symbols are used for common elements and explanation for them are omitted accordingly.

Figure 1:
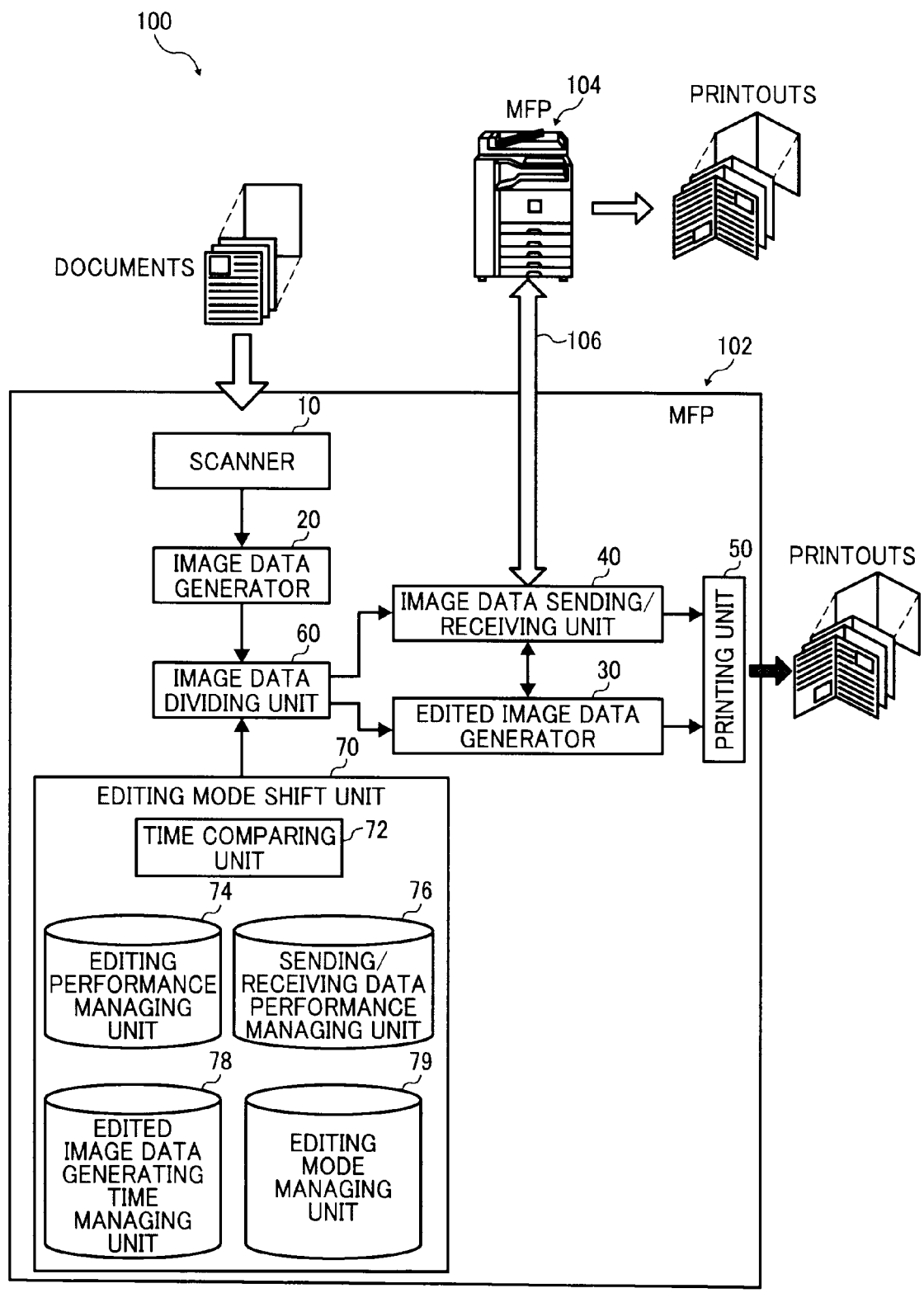
FIG. 1 is a diagram illustrating a distributed printing system according to the present invention.

FIG. 1 illustrates a distributed printing system 100 as an embodiment of the present invention. The distributed printing system 100 includes a number of image forming apparatuses. It should be noted that, for convenience of explanation, although FIG. 1 illustrates a system that consists of two MFPs, a MFP 102 and a MFP 104, the number of image forming apparatuses of the distributed printing system of the present invention is not limited to two and can consist of three or more image forming apparatuses.

In the distributed printing system 100, the MFP 102 and the MFP 104 are connected via a network 106, which is a private network or some other appropriate network such as a LAN, and configured so that they can send and receive data to and from each other.

Next, functional units that each image forming apparatus in the distributed printing system 100 owns are illustrated based on a function block diagram of the MFP 102 in FIG. 1. The MFP 102 consists of units including a scanner 10 to scan a document, a image data generator 20 to generate image data for each scanned document, an edited image data generator 30 to edit the generated image data and generate edited image data, an image data sending/receiving unit 40 to send and receive image data to and from the MFP 104, and a printing unit 50 to print out image data.

The edited image data generator 30 is a functional unit which edits image data generated for each document and generates edited image data. A representative example of editing executed by the edited image data generator 30 is consolidating that puts multiple image data together into image data corresponding to one print surface. The printing unit 50 generates printing data based on edited image data generated by the edited image data generator 30, and prints out the printing data.

The image data sending/receiving unit 40 transfers image data generated by the image data generator 20 or edited image data generated by the edited image data generator 30 to the MFP 104. Likewise, edited image data generated by the edited image data generator 30 in the MFP 104 is transferred to the MFP 102, and the image data sending/receiving unit 40 receives the edited image data. The printing unit 50 generates printing data based on edited image data received from the MFP 104 by the image data sending/receiving unit 40 and prints out the printing data.

The distributed printing system 100 of this embodiment is characterized by executing editing in collaboration with the MFP 102 and the MFP 104 to maximize the productivity of the whole system. To put this collaborative editing into practice, the MFP 102 has an image data dividing unit 60. A description will now be given of the image data dividing unit 60.

The image data dividing unit 60 of this embodiment divides image data generated by the image data generator 20 into a first group that has to be edited by the MFP 102 and a second group that the MFP 104 has to be requested to edit. Subsequently, the edited image data generator 30 executes editing regarding the first group, and the image data sending/receiving unit 40 transfers the second group to the MFP 104 and requests the MFP 104 to edit the second group.

In case editing generates one edited image data from one image data, the image data dividing unit 60 sorts image data in order of scanning. Subsequently, the image data dividing unit 60 divides sorted n-number of image data by the number of MFPs (i.e. 2) and splits the n-number of image data into two groups. More specifically, the image data dividing unit 60 divides the n-number of image data into a first group that consists of first (n/2)-number of image data and a second group that consists of latter (n/2)-number of image data. It should be noted that the image data dividing unit 60 divides image data so that the number of data in each group is roughly equal based on appropriate rules in case (n/2) is not a natural number.

Figure 2:
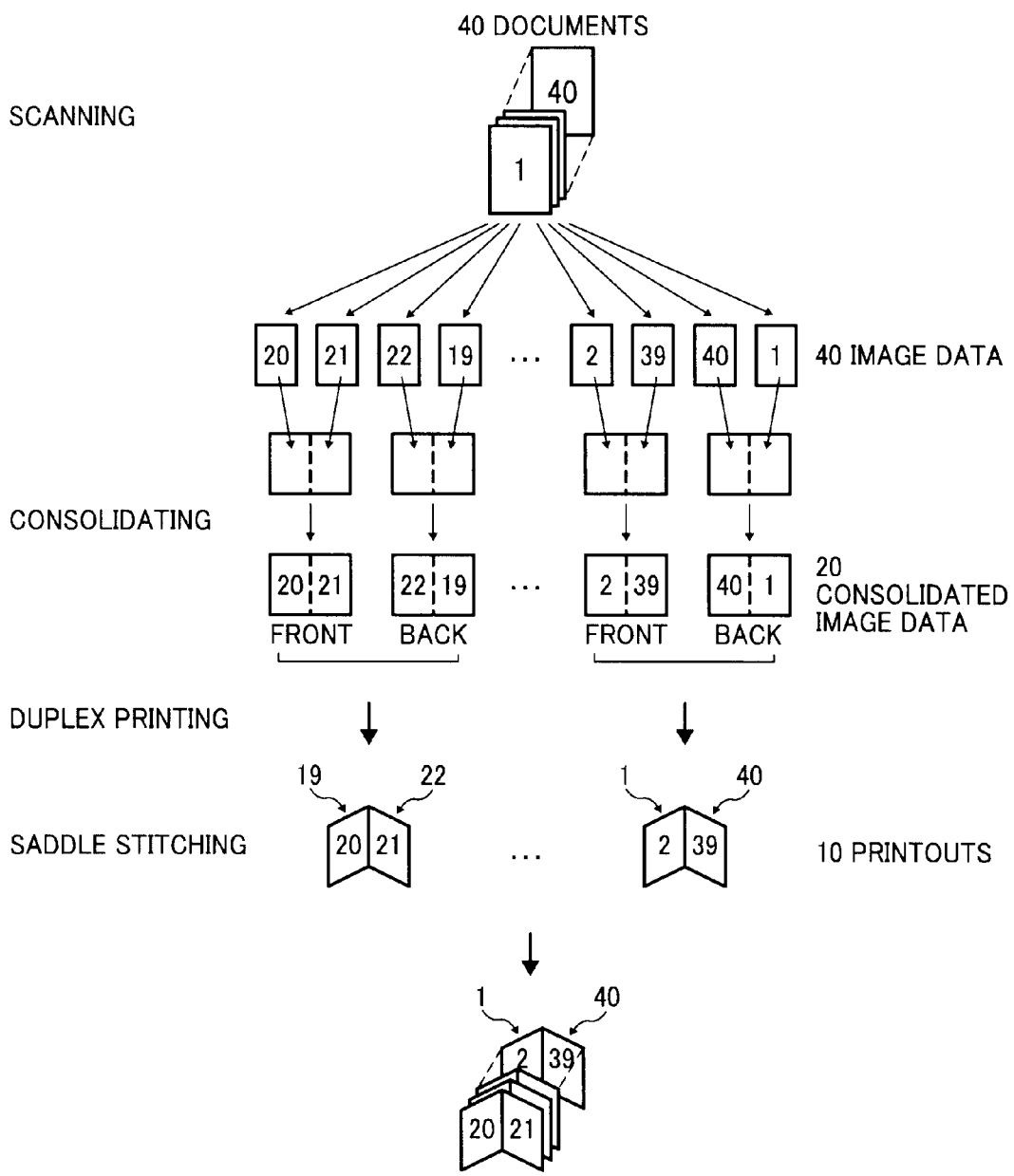
FIG. 2 is a conceptual diagram illustrating a magazine printing mode.

A description will now be given of dividing whereby the image data dividing unit 60 executes in magazine printing mode. As background, a description will first be given of magazine printing mode itself, with reference to FIG. 2.

For example, in case a user prints 40 documents in magazine printing mode, first off, all documents are scanned and 40 image data are generated. Next, based on the order of scanning, 40 image data are divided into 10 pairs and each pair consists of 4 image data that ought to be printed on front and back surface of one sheet of paper in saddle stitch printing. Next, for each pair, 2 image data that ought to be printed on the same surface (front or back surface) of paper is consolidated and one consolidated image data is generated (consolidating.) Lastly, generated 20 consolidated image data is duplex printed in appropriate order corresponding to saddle stitch printing, and 10 sheets of duplex printed paper are saddle stitched and turned into a booklet.

Figure 3:
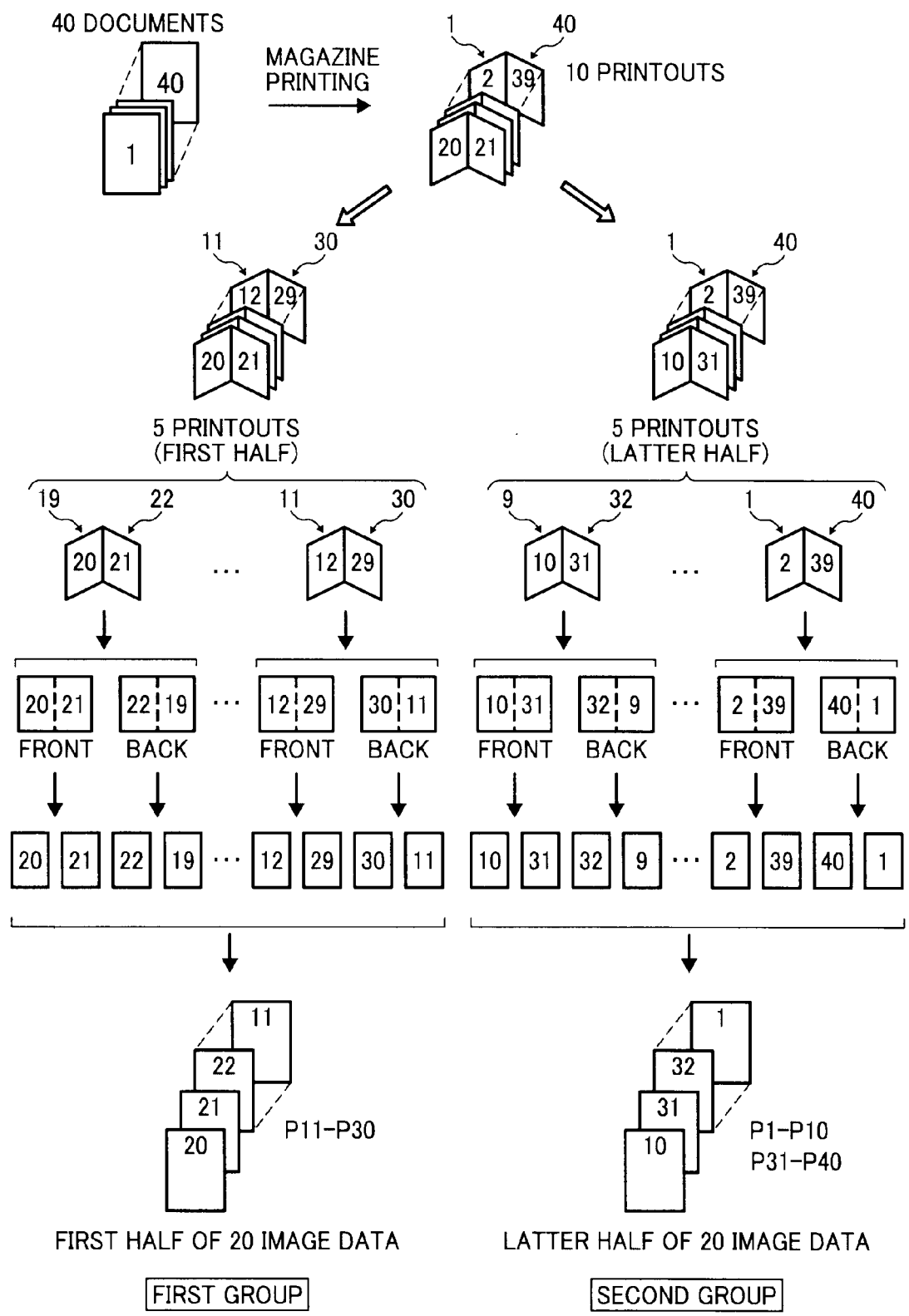
FIG. 3 is a conceptual diagram illustrating dividing for image data in the magazine printing mode.

To distribute the consolidating in magazine printing mode described above, the image data dividing unit 60 divides image data in accordance with the following rule. A description will be given of scanning 40 documents. In this embodiment, the image data dividing unit 60 sorts the generated 40 sets of image data in appropriate order corresponding to saddle stitch printing based on the order of scanning. More specifically, the image data dividing unit 60 sorts the 40 image data in order shown in FIG. 3 so that the twentieth scanned image data comes first and the first scanned image data comes last. After that, the image data dividing unit 60 generates a first group with the first half of 20 image data (corresponding to document P11-P30) from the scanned and sorted 40 image data, and generates a second group with the latter half of 20 image data (corresponding to document P1-P10 and P31-P40.)

It should be noted that, in case even number of MFPs execute printing in magazine printing mode, 4 image data that ought to be printed on both sides of a single sheet of paper should belong to a same group, so the image data dividing unit 60 cannot divide image data evenly if the number of printouts is an odd number. In this case, the image data dividing unit 60 divides image data based on an appropriate rule. For example, in case a user prints 20 documents in magazine printing mode by using two MFPs (the number of printouts is five), the image data dividing unit 60 categorizes 8 image data (P7-

P14) into Group A, 8 image data (P1-P4, P17-P20) into Group B, and 4 image data (P5-P6 and P15-P16) into Group C, then generates a first group with (A+C) and a second group with (B), or a first group with (A) and a second group with (B+C).

As described above, while the distributed printing system 100 maximizes the productivity of the whole system by distributing the burden of editing which becomes a bottleneck over a number of MFPs, under the condition that data transferring becomes a bottleneck due to the low performance for sending/receiving data inside the system (editing time<<transferring time), the productivity of the whole system deteriorates contrariwise in case editing is distributed. To resolve this issue, in this embodiment, the system can be configured to shift dynamically between two operational modes, collaborative processing mode and centralized processing mode, based on editing performance and sending/receiving data performance of a MFP. It should be noted that collaborative processing mode means a mode in which distributes execution of editing for image data between a parent device and a child device, and centralized processing mode means a mode in which a parent device executes all of editing.

An editing mode shift unit 70 is a functional unit to shift collaborative processing mode and centralized processing mode dynamically. In this embodiment, the editing mode shift unit 70 can consist of a time comparing unit 72, an editing performance managing unit 74, and a sending/receiving data performance managing unit 76. The editing performance managing unit 74 manages editing performance for each kind of editing. By contrast, the sending/receiving data performance managing unit 76 manages sending/receiving data performance for each connection to other MFP in the system.

The time comparing unit 72 responds to the selection for specified editing (e.g. if a user chooses magazine printing mode, that means the default centralized process is also selected), acquires editing performance corresponding to the editing from the editing performance managing unit 74, calculates required time to generate edited image data per unit image (edited image data generating time) based on the editing performance, acquires sending/receiving performance data corresponding to the connection between a target MFP and the MFP 102 from the sending/receiving data performance managing unit 76, and calculates required time to send edited image data per unit image (edited image data sending time) based on the sending/receiving data performance. Then, if the time comparing unit 72 determines that edited image data sending time is longer than edited image data generating time after comparing them, the time comparing unit 72 notifies that centralized processing mode is chosen to the image data dividing unit 60. By contrast, if the time comparing unit 72 determines edited image data sending time is shorter than edited image data generating time after comparing them, the time comparing unit notifies that collaborative processing mode is chosen to the image data dividing unit 60.

In case the time comparing unit 72 notifies centralized processing mode, the image data dividing unit 60 does not divide the image data, and all of the image data is edited by the edited image data generator 30. By contrast, in case the time comparing unit 72 notifies collaborative processing mode, the image data dividing unit 60 divides the image data, and the first group that ought to be edited by the MFP 102 itself is edited by the edited image data generator 30 and the second group to be requested the MFP 104 to edit is transferred to the MFP 104 via the image data sending/receiving unit 40.

It should be noted that, in another embodiment standard time of edited image data generating time per unit image for each kind of editing can be predefined and managed by an edited image data generating time managing unit 78. In this case, the time comparing unit 72 does not calculate edited image data generating time dynamically but acquires standard time corresponding to the kind of chosen editing from the edited image data generating time managing unit 78 and considers it as edited image data generating time.

Furthermore, in another embodiment data sending/receiving performance can be decided dynamically for each connection by the known method such as sending/receiving data to/from a target MFP to measure time, and edited image data sending time can be calculated based on the data sending/receiving performance.

Furthermore, in another embodiment the editing mode shift unit 70 can have an editing mode managing unit 79 which manages collaborative processing mode and centralized processing mode associated with each kind of editing in advance. In this case, the editing mode shift unit 70 acquires editing mode corresponding to the chosen editing from the editing mode managing unit 79 and notifies the editing mode to the image data dividing unit 60. Each functional unit in image forming apparatus that consists of the distributed printing system 100 has been described above. A description will now be given of operation of the distributed printing system 100 in this embodiment in detail in magazine printing mode as an exemplification.

In magazine printing mode, consolidating is the default editing. In this case, if time required to send consolidated image data per unit image is shorter than time required to generate the consolidated image data, the productivity of the whole distributed printing system 100 can be improved by distributing the consolidating (the editing). A description will now be given of this case in detail based on FIG. 4 and FIG. 5. It should be noted that the case to print 40 documents in magazine printing mode is taken for example in the following description.

FIG. 4(a) illustrates the processing status of the distributed printing system 100 in Step 1. In the beginning, a user chooses magazine printing mode via an operation panel and pushes a print start button after setting 40 documents to the MFP 102 (parent device.) The parent device responds to the user's operation, scans the 40 documents in order, and generates 40 image data.

Next, the parent device divides 40 image data into a first group processed consolidating by the MFP 102 itself (20 image data that ought to be duplex printed on the first 5 sheets of paper) and a second group processed consolidating by the MFP 104 (child device) (20 image data that ought to be duplex printed on the latter 5 sheets of paper.) (Refer to FIG. 3 in detail.)

Next, the parent device starts consolidating the first group (first 20 image data), transfers the second group (latter 20 image data) to the child device, and requests the child device to consolidate the data. After the completion of transferring data to the child device, the processing status proceeds to Step 2 in FIG. 4(b).

In Step 2, the parent device continues consolidating the first group. By contrast, the child device starts consolidating the second group transferred from the parent device. Next, after the parent device finishes consolidating the first group, the processing status proceeds to Step 3 in FIG. 5(a).

In Step 3, after the parent device finishes consolidating the first group, the parent device executes duplex printing (5 output sheets) based on the first consolidated image data (first 10 data) and transfers the first consolidated image data (first 10 data) to the child device. By contrast, the child device continues consolidating the second group. After the child device finishes consolidating the second group, the processing status proceeds to Step 4 in FIG. 5 (*b*).

In Step 4, the child device executes duplex printing (5 output sheets) based on the first consolidated image data (first 10 data) transferred from the parent device and transfers the second consolidated image data (latter 10 data) generated by consolidating the second group to the parent device. After the child device finishes transferring data to the parent device, the processing status proceeds to Step 5 in FIG. 5 (*c*).

In Step 5, just after the child device finishes duplex printing the first consolidated image data (first 10 data), the child device executes duplex printing (5 output sheets) of the second consolidated image data (latter 10 data) consolidated by the child device itself. By contrast, the parent device executes duplex printing (5 output sheets) of the second consolidated image data (latter 10 data) transferred from the child device. Lastly, the parent device and the child device each executes saddle stitching for 10 duplex printed sheets in total, and the collaborating print in magazine printing mode finishes.

Figure 6:
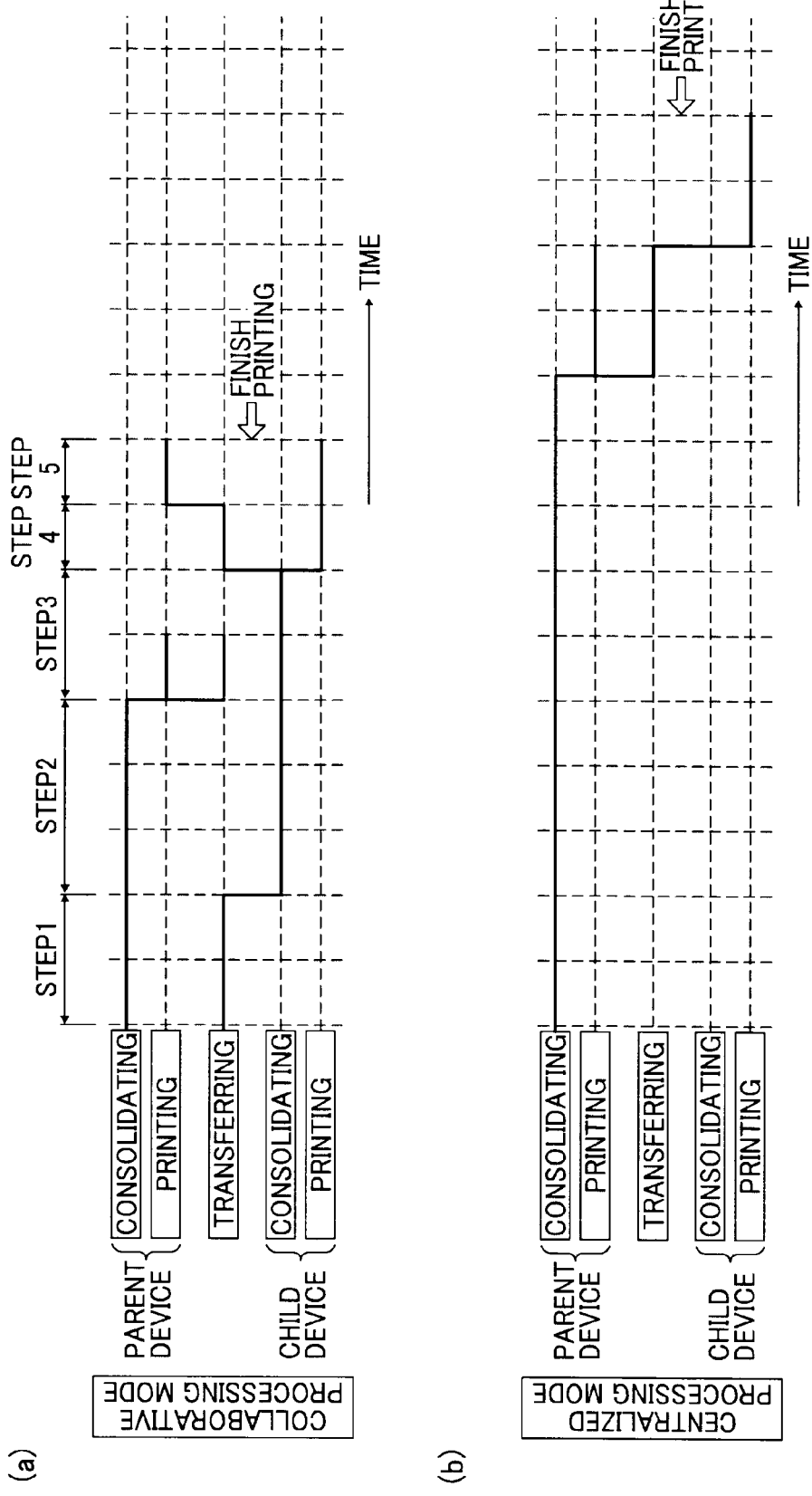
FIG. 6 is a diagram illustrating timetable of process that a parent device and child device execute for each editing mode.
Figure 7:
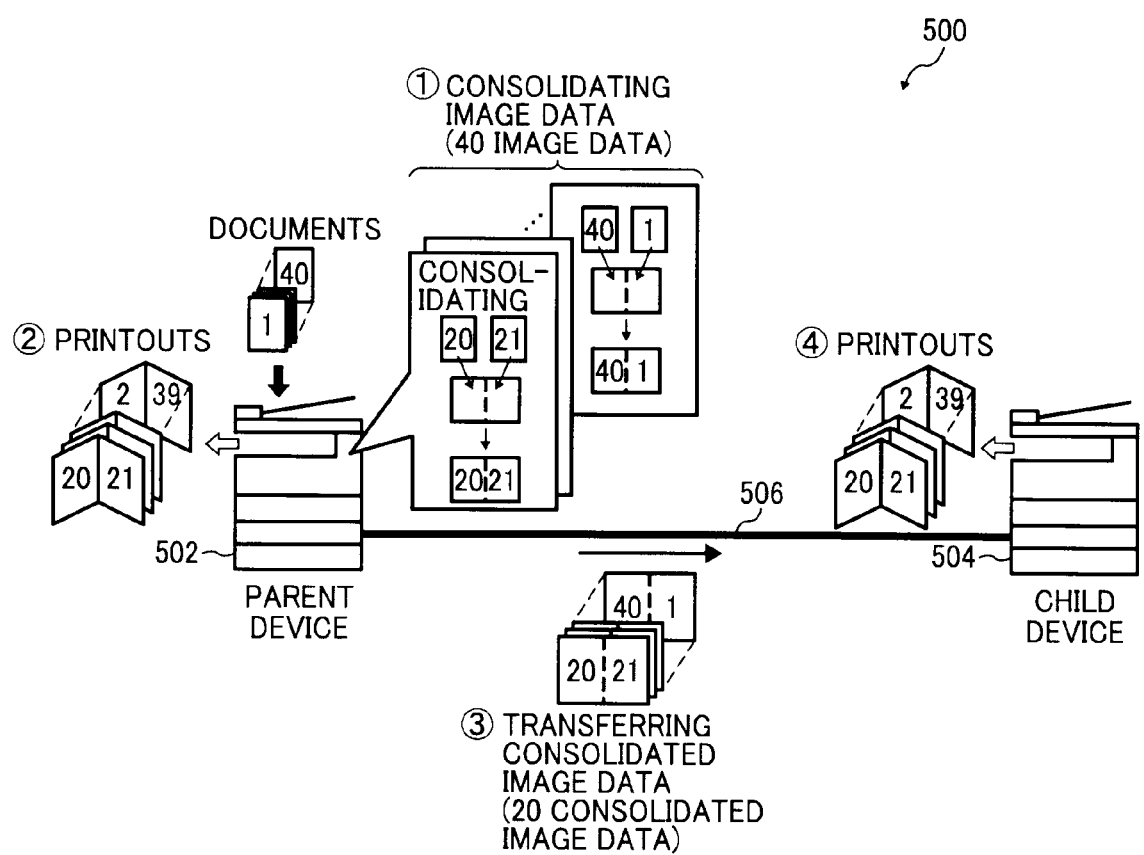
FIG. 7 is a timing diagram illustrating operation of a conventional consolidated printing system.

FIG. 6 (*a*) illustrates a time table for process (consolidation, print, and transfer) executed by the parent device and the child device in collaborative processing mode. It should be noted that FIG. 6 (*b*) illustrates a time table when centralized processing mode is adapted in case consolidating time per unit image is much longer than transferring time for comparison. By comparing FIGS. 6 (*a*) and (*b*), it is obvious to shorten printing completion time of the whole distributed printing system 100 and improve the productivity by adopting collaborative processing mode in case consolidating time per unit image is much longer than transferring time (consolidating time>>transferring time).

Each feature in the embodiments described above can be implemented as executable programs written by legacy programming languages and object oriented programming languages such as assembler, C, Visual C, C++, Visual C++, Java™, Java™ Beans, Java™ Applet, Java™ Script, Perl, and Ruby, stored in readable memory media, and distributed.

The foregoing has described embodiments of the present invention. However, the invention should not be construed as limited to the particular embodiments discussed, and as will be understood by those of skill in the art, the invention may be embodied in other specific forms without departing from the scope of the present invention.

What is claimed is:

1. A distributed printing system, comprising:
a first image forming apparatus as a parent device; and
a second image forming apparatus as a child device, the second image forming apparatus connectable to the first image forming apparatus for executing a printing process,
each of the first and the second image forming apparatuses including:
an image data generator to generate image data for each scanned document;
an image data dividing unit to divide the generated image data into first image data and second image data, the first image data to be edited by one image forming apparatus selectable from the first and the second image forming apparatus, the second image data being data that an image forming apparatus not selected for editing the first image data is requested to edit;
an edited image data generator to edit the image data to generate edited image data;
an image data sending/receiving unit to send and receive image data to and from other image forming apparatus;
a printing unit; and
an editing mode shift unit to select one of a collaborative processing mode in which editing of the image data is distributed between the first and second image forming apparatuses and a centralized processing mode in which the first image forming apparatus executes all editing of the image data,
wherein the editing mode shift unit selects the collaborative processing mode if an edited image data generating time required to generate the edited image data is longer than edited image data sending time required to send the edited image data to the second image forming apparatus,
wherein, in the collaborative processing mode,
the first image forming apparatus generates the image data, sends the second image data to the second image forming apparatus, which shares printing with the first image forming apparatus, and the first image forming apparatus generates first edited image data by editing the first image data, and sends the first edited image data to the second image forming apparatus,
the second image forming apparatus generates second edited image data by editing the second image data received from the first image forming apparatus, sends the second edited image data to the first image forming apparatus, and prints out the first edited image data received from the first image forming apparatus and the second edited image data sequentially, and
the first image forming apparatus prints out the first edited image data and the second edited image data received from the second image forming apparatus sequentially.

2. An image forming apparatus, comprising:
an image data generator to generate image data for each scanned document;
an image data dividing unit to divide the generated image data into first image data to be edited by the image forming apparatus itself and second image data that another image forming apparatus is requested to edit;
an edited image data generator to edit the image data to generate edited image data;
an image data sending/receiving unit to send and receive image data to and from other image forming apparatuses;
a printing unit; and
an editing mode shift unit to select one of a collaborative processing mode in which editing of the image data is distributed between the image forming apparatus and the other image forming apparatus and a centralized processing mode in which the image forming apparatus executes all editing of the image data,
wherein the editing mode shift unit selects the collaborative processing mode if an edited image data generating time required to generate the edited image data is longer than edited image data sending time required to send the edited image data to the other image forming apparatus,
wherein the edited image data generator generates first edited image data by editing the first image data, and the image data sending/receiving unit sends the second image data to the other image forming apparatus as a child device and requests the child device to edit the second image data, and sends the first edited image data to the child device and receives the second edited image data generated by editing the second image data by the child device from the child device if the image forming apparatus operates as a parent device and if the editing mode shift unit selects the collaborative processing mode, wherein the edited image generating unit edits the second image data to generate the second edited image data, and the image data sending/receiving unit receives the second image data and the first edited image data from the parent device, and sends the second edited image data to the parent device if the image forming apparatus operates as the child device, and wherein the printing unit prints out the first edited image data and the second edited image data sequentially.

3. The image forming apparatus according to claim 2, the editing mode shift unit further comprising a time comparing unit to compare the edited image data generating time required to generate the edited image data and the edited image data sending time required to send the edited image data to the child device, wherein the editing mode shift unit selects the centralized processing mode if the edited image data generating time is shorter than the edited image data sending time.

4. The image forming apparatus according to claim 3, the editing mode shift unit comprising data sending/receiving performance management unit for managing data sending/receiving performance for each of the child device connected to the parent device, wherein the time comparing unit compares the edited image data sending time calculated based on the data sending/receiving performance corresponding to the connected child device.

5. The image forming apparatus according to claim 3, wherein the time comparing unit determines data sending/receiving performance for each of the child device connected to the parent device dynamically and compares the edited image data sending time calculated on the basis of the determined data sending/receiving performance and the edited image data generating time.

6. The image forming apparatus according to claim 3, the editing mode shift unit comprising edited image data generating time management unit to manage standard time of the edited image data generating time for each kind of editing, wherein the time comparing unit compares the standard time corresponding to each kind of selected editing and the edited image data sending time.

7. The image forming apparatus according to claim 3, the editing mode shift unit comprising editing performance management unit to manage editing performance for each kind of editing, wherein the time comparing unit compares the edited image data generating time calculated based on the editing performance corresponding to each kind of selected editing and the edited image data sending time.

8. An image forming apparatus comprising:

an image data generator to generate image data for each scanned document;

an image data dividing unit to divide the generated image data into first image data to be edited by the image forming apparatus itself and second image data that another image forming apparatus is requested to edit;

an edited image data generator to edit the image data to generate edited image data;

an image data sending/receiving unit to send and receive image data to and from other image forming apparatuses;

a printing unit; and an editing mode shift unit to select one of a collaborative processing mode in which editing of the image data is distributed between the image forming apparatus and another image forming apparatus and a centralized processing mode in which the image forming apparatus executes all editing of the image data, the editing mode shift unit comprising an editing mode management unit that associates each kind of editing with either the collaborative processing mode or the centralized processing mode, wherein the editing mode shift unit selects one of the collaborative processing mode and the centralized processing mode corresponding to the type of editing selected, wherein the edited image data generator generates first edited image data by editing the first image data, and the image data sending/receiving unit sends the second image data to the other image forming apparatus as a child device and requests the child device to edit the second image data, and sends the first edited image data to the child device and receives the second edited image data generated by editing the second image data by the child device from the child device if the image forming apparatus operates as a parent device and if the editing mode shift unit selects the collaborative processing mode, wherein the edited image generating unit edits the second image data to generate the second edited image data, and the image data sending/receiving unit receives the second image data and the first edited image data from the parent device, and sends the second edited image data to the parent device if the image forming apparatus operates as the child device, and wherein the printing unit prints out the first edited image data and the second edited image data sequentially.

9. A method of printing by an image forming apparatus collaboratively connectable to another image forming apparatus, comprising:

generating image data for each scanned document;

selecting a collaborative processing mode in which editing of the image data is distributed between the image forming apparatus and the other image forming apparatus and a centralized processing mode in which the image forming apparatus executes all editing of the image data, wherein the collaborative processing mode is selected if an edited image data generating time required to generate edited image data is longer than edited image data sending time required to send the edited image data to the other image forming apparatus;

if the collaborative processing mode is selected and the image forming apparatus operates as a parent device, dividing the generated image data into first image data and second image data, the first image data to be edited by the image forming apparatus itself, and the second image data being data that the other image forming apparatus is requested to edit; and generating first edited image data by editing the first image data, sending the second image data to the other image forming apparatus and requesting the other image forming apparatus to edit the second image data, sending the first edited image data to the other image forming apparatus, and receiving second edited image data which the other image forming apparatus generated by editing the second image data from the other image forming apparatus;

generating the second edited image data by editing the second image data received from the other image forming apparatus, receiving the first edited image data from the other image forming apparatus, and sending the second edited image data to the other image forming apparatus, if the image forming apparatus operates as a child device; and printing out the first edited image data and the second edited image data sequentially.

10. A method of printing by an image forming apparatus collaboratively connectable to another image forming apparatus, comprising:

selecting one of a collaborative processing mode to distribute editing of image data between the image forming apparatus as a parent device and the other image forming apparatus as a child device and centralized processing mode in which the parent device executes all editing of image data, wherein the collaborative processing mode is selected if an edited image data generating time required to generate edited image data is longer than edited image data sending time required to send the edited image data to the other image forming apparatus;

generating image data for each scanned document;

dividing the generated image data into first image data and second image data, the first image data to be edited by the image forming apparatus itself, and the second image data being data that the other image forming apparatus is requested to edit, if the edit mode is set to the collaborative processing mode;

generating first edited image data by editing the first image data, sending the second image data to the other image forming apparatus and requesting the other image forming apparatus to edit the second image data, sending the first edited image data to the other image forming apparatus, and receiving second edited image data which the other image forming apparatus generated by editing the second image data from the other image forming apparatus, if the edit mode is set to the collaborative processing mode and the image forming apparatus operates as a parent device;

generating the second edited image data by editing the second image data received from the other image forming apparatus, receiving the first edited image data from the other image forming apparatus, and sending the second edited image data to the other image forming apparatus, if the edit mode is set to the collaborative processing mode and the image forming apparatus operates as a child device; and printing out the first edited image data and the second edited image data sequentially.

11. A method according to claim 10, wherein the selecting comprising:

comparing an edited image data generating time required to generate the edited image data and an edited image data sending time required to send the edited image data to the other image forming apparatus; and selecting the collaborative processing mode if the edited image data generating time is longer than the edited image data sending time and selecting the centralized processing mode if the edited image data generating time is shorter than the edited image data sending time.

* * * * *